US007849126B1

(12) United States Patent
Gonzalez et al.

(10) Patent No.: US 7,849,126 B1
(45) Date of Patent: Dec. 7, 2010

(54) SYSTEM AND METHOD FOR FAST MATRIX FACTORIZATION

(75) Inventors: Juan Guillermo Gonzalez, Weston, FL (US); Jeronimo Castrillon, Aachen (DE)

(73) Assignee: Intellectual Property Systems, LLC, Weston, FL (US)

( * ) Notice: Subject to any disclaimer, the term of this patent is extended or adjusted under 35 U.S.C. 154(b) by 945 days.

(21) Appl. No.: 11/682,799

(22) Filed: Mar. 6, 2007

Related U.S. Application Data

(60) Provisional application No. 60/767,130, filed on Mar. 6, 2006.

(51) Int. Cl.
*G06F 7/32* (2006.01)
*G06F 7/38* (2006.01)

(52) U.S. Cl. .................. 708/520; 708/446; 708/607

(58) Field of Classification Search ............. 708/520, 708/446, 607
See application file for complete search history.

(56) References Cited

U.S. PATENT DOCUMENTS

| 6,397,236 | B1* | 5/2002 | Garg et al. .................. 708/446 |
| 6,907,513 | B2* | 6/2005 | Nakanishi ..................... 712/17 |
| 7,219,119 | B2* | 5/2007 | Briemle et al. .............. 708/520 |
| 2004/0181565 | A1* | 9/2004 | Ikeda ......................... 708/446 |
| 2006/0173947 | A1* | 8/2006 | Gustavson et al. .......... 708/607 |
| 2006/0265445 | A1* | 11/2006 | Gustavson et al. .......... 708/520 |

\* cited by examiner

*Primary Examiner*—Chuong D Ngo
(74) *Attorney, Agent, or Firm*—Mayback & Hoffman, P.A.; Gregory L. Mayback; Katie M. Blakley

(57) ABSTRACT

The Present invention provides a system and method for fast computing the Cholesky factorization of a positive definite matrix. In order to reduce the computation time of matrix factorizations, the present invention uses three atomic components, namely MA atoms, M atoms, and an S atom. The three kinds of components are arranged in a configuration that returns the Cholesky factorization of the input matrix.

1 Claim, 3 Drawing Sheets

SYSTEM AND METHOD FOR FAST MATRIX FACTORIZATION

CROSS-RELATED APPLICATIONS

This application is related to and claims priority to the U.S. Provisional Patent Application No. 60/767,130, entitled FAST MATRIX FACTORIZATION ALGORITHMS, filed on Mar. 6, 2006 the entire contents of which are incorporated herein by reference.

STATEMENTS REGARDING FEDERALLY SPONSORED RESEARCH OR DEVELOPMENT

The invention described herein was made in the performance of work under Air Force Small Business Innovation Research (SBIR) Contract FA8650-05-M-3556.

FIELD OF THE INVENTION

The present invention relates generally to computer systems for the solution of arithmetic problems and specifically to matrix factorization.

BACKGROUND OF THE INVENTION

The innermost computational kernel of many large numerical problems is often a large sparse matrix problem, which typically consumes a significant portion of the overall computational time required by the problem. Applications in numerous fields make intensive use of matrix computations, including Aerospace and automotive industries, computational fluid dynamics (CFD), defense, digital content creation, digital media, electronics, energy, finance, economic and financial forecasting, computational chemistry, molecular biology, computational physics, civil engineering, environmental engineering, gaming, geophysics, image processing, information processing services, life sciences, media, medicine, semiconductors, telecommunications, weather and climate research, weather forecasting, etc.

The methods for solving linear systems of equations are usually divided into direct and iterative. Also, depending on the structure of the problem, they can be divided into the ones that solve dense problems and the ones that solve sparse problems. It is not clear the best way to solve a large linear system of equations. However there are some indications that the selection of the kind of method depends very much on the particular problem: the sparsity and nonzero structure of the matrix, the efficiency of the preconditioner for the iterative method, and even a bit on the right hand side. In general, it is accepted to use direct methods for 1D and 2D problems, and iterative methods for 3D problems.

Direct methods are general techniques that provide high accuracy because they are analytical solutions. They usually have high memory costs and are advantageous when different right hand vectors are present. Examples of direct methods are: matrix inverse, Gaussian elimination, LU decomposition, QR decomposition, and Cholesky factorizaton Iterative methods generate a sequence of iterates that are approximate solutions, and hopefully converge quickly towards the exact solution. Iterative methods efficiency depends on the type of the problem and the preconditioner used. If the preconditioner provides a matrix with a good condition number then the solution can be faster than the direct solution. The preconditioner is a transformation matrix that is used to convert the coefficient matrix into one with a more favorable spectrum (related with an improvement of the condition number). Iterative methods generally have lower memory costs but changing the right-hand vector implies solving the whole problem again. Iterative methods can be divided into stationary and non stationary methods. Non stationary methods differ from stationary methods in that the computations involve information that changes at each iteration. Examples of stationary methods are the Jacobi's method, Gauss-Seidel, Successive Overrelaxation (SOR), and Symmetric SOR. Examples of non stationary methods include Conjugate Gradient, Minimum Residual, and Generalized Minimum Residual.

In general, the problem of solving these systems of equations is addressed by software solutions, which translates into the use of traditional processor-based von Neumann architectures. For direct methods, that are the methods that can guarantee exact solutions, current solutions are still slow for a large number of applications, where, given the size of the problem, can take from hours to months to be solved.

There is then a need for a system and method for faster solutions of matrix problems, able to guarantee the delivery of accurate results. It is desired that this new systems and method could be easily integrated into a large number of engineering and science applications.

SUMMARY OF THE INVENTION

The Present invention provides a system and method for fast computing the Cholesky factorization of a positive definite matrix. In order to reduce the computation time of matrix factorizations, the present invention uses three atomic components, namely MA atoms, M atoms, and an S atom. The three kinds of components are arranged in a configuration that returns the Cholesky factorization of the input matrix.

DETAILED DESCRIPTION

The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

An embodiment of the present invent is a hardware architecture for the implementation of the Recursive Cholesky Factorization Algorithm. The goal of this factorization is to find a lower triangular matrix with positive diagonal elements $L=[l_{ij}]$, given a square Hermitian positive definite matrix A∈Mn, so that: $A=L\times(Lc)^T$, Where Lc is the complex conjugate of L, and $(Lc)^T$ is the transpose of the matrix (Lc).

The problem of finding the elements $1_{ij}$ can be expressed as a nonlinear system of $n(n+1)/2$ equations whose solution is:

$$l_{jj} = \sqrt{a_{jj} - \sum_{i=1}^{j-1} l_{ji}^2}$$

$$l_{ji} = \frac{1}{l_{ii}}\left[a_{ij} - \sum_{k=1}^{i-1} l_{ik} \cdot l_{jk}\right] \forall\, j > i, \quad \text{with} \sum_{k=1}^{0} l_{ik} \cdot l_{jk} = 0.$$

In its recursive implementation, the Cholesky factorization of a matrix $A=[a_{ij}]_{n\times n}$ (overwriting the matrix) is obtained by the successive execution of the following steps:

1) $a_{11} \leftarrow \sqrt{a_{11}}$

2) $a_{i1} \leftarrow \dfrac{a_{i1}}{a_{11}} \forall\, i \geq 2$

3) $a_{ij} \leftarrow a_{ij} - a_{i1}\cdot a_{j1} \forall\, i, j \geq 2.$

Figure 1:
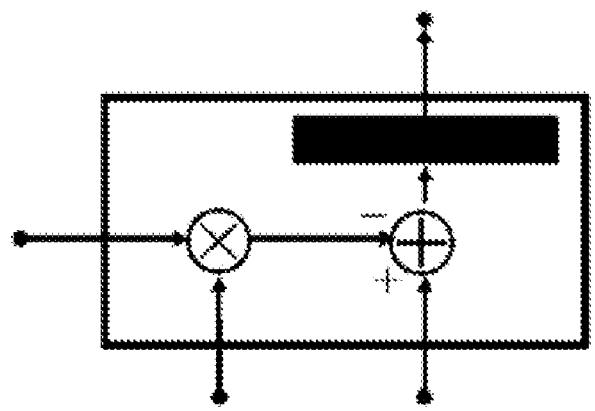
FIG. 1 shows the MA-atom, one of the components of an embodiment of the present invention.
Figure 2:
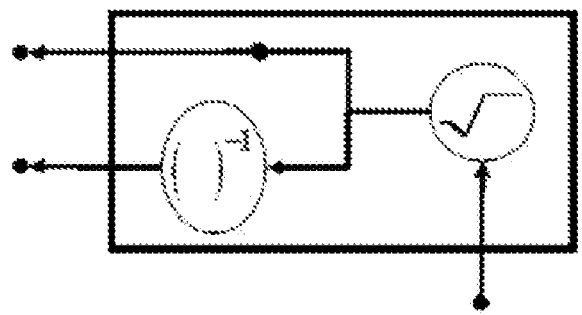
FIG. 2 shows the S-atom, one of the components of an embodiment of the present invention.
Figure 3:
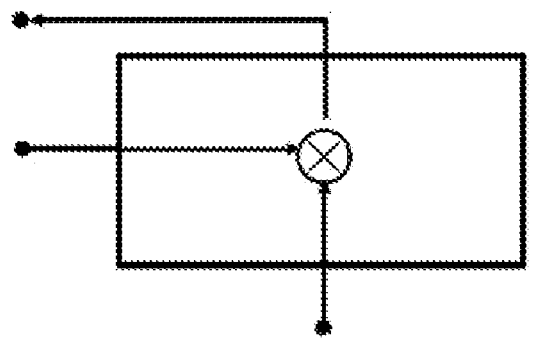
FIG. 3 shows the M-atom, one of the components of an embodiment of the present invention.

Recursive Cholesky enables super-modular architecture in hardware. The present architecture is composed by three basic atoms. The first and most important one is called the MA-Atom, where MA stands for Multiply-Add. This atom is composed by a multiplier, an adder and a register as shown in FIG. 1. The objective of the MA-Atom atom is to compute the third step of the recursive Cholesky algorithm. The other two remaining atoms (called S-atom and M-atom), shown in FIG. 2 and FIG. 3, are intended for the calculation of the first and second steps respectively.

Figure 4:
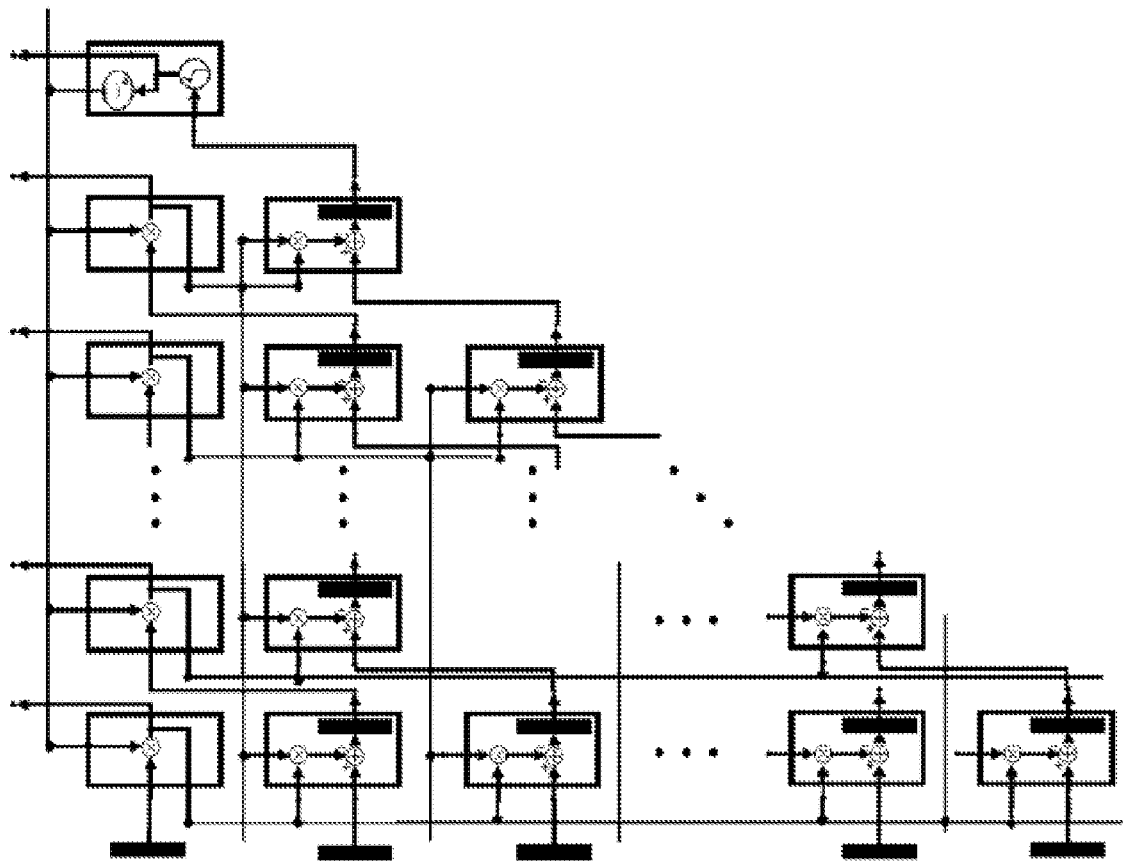
FIG. 4 illustrates the Cholesky array, a matrix factorization array in accordance to an embodiment of the present invention.

These atoms are then used as fundamental building blocks in the complete parallel architecture shown in FIG. 4. Suppose that this architecture will be used for factorizing a dense matrix $A\in Mn$, so there are n rows and n columns. If the blocks are indexed in a matrix-wise fashion, the inputs for the multiplier in the MA-atom, (row i and column j) are connected to the outputs of the atoms S-atom$_{ii}$ and S-atom$_{ij}$. As shown in the FIG. 4, the result of this multiplication is then subtracted to the value on the register of the MA-atom$_{(i+1)(j+1)}$. All the M-atoms share as input the lower output of the S-atom and the other input comes from MA-atom$_{(i+1)2}$ for the M-atom$_{ij}$. Finally, the S-atom receives its input from the register in the MA-atom$_{22}$. These operations can be summarized as follows:

1) $S_{low}=(R_{22})^{-\frac{1}{2}}$

2) $M_{i1}=S_{low}\cdot R_{(i+1)2} \forall i\in N,\ 2\leq i\leq n-1$

Figure 5:
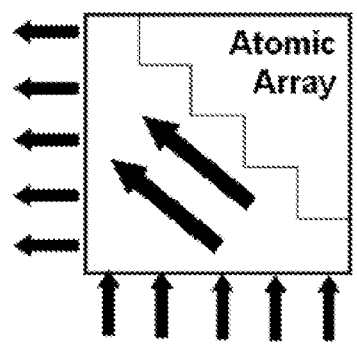
FIG. 5 illustrates the dataflow in the Cholesky array, in accordance to an embodiment of the present invention.

3) $R_{ij}=R_{(i+1)(j+1)}-M_{i1}\cdot M_{j1} \notin i,j\in N,\ 2\leq i,j\leq n-1,$ where $S_{low}$ represents the lower output of the S-atom, $M_{ij}$ stands for the output of the M-atom$_{ij}$ and $R_{ij}$ is the value on the register of the MA-atom$_{ij}$. Due to de connections described above the resulting data flow inside the atomic array is the one illustrated in FIG. 5.

Figure 6:
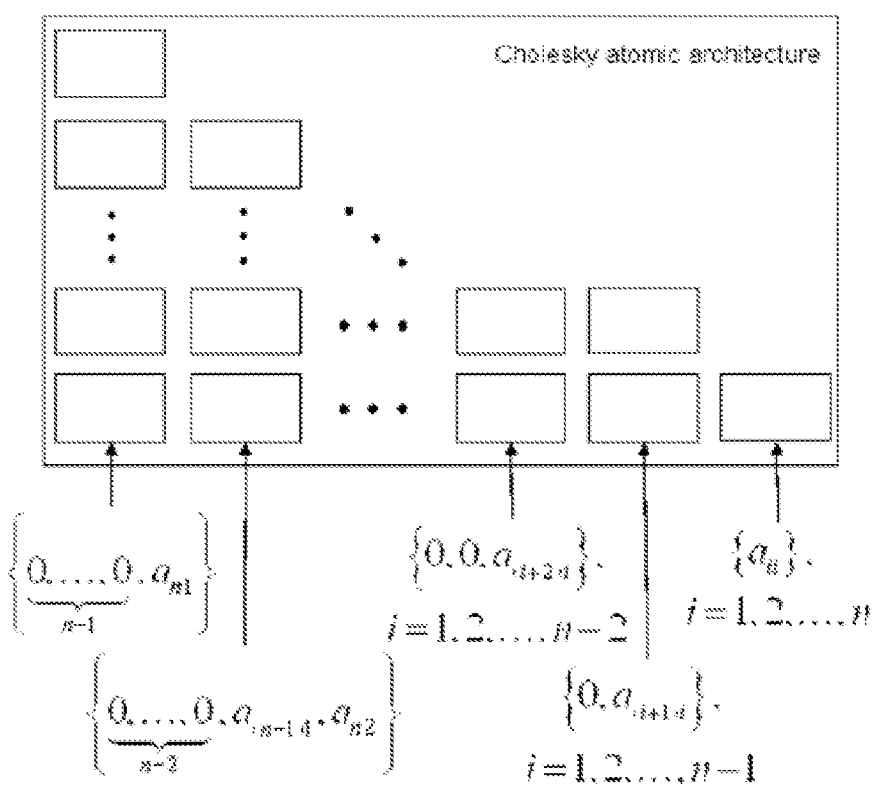
FIG. 6 shows a diagram of the data initialization of the Cholesky array, in accordance to an embodiment of the present invention.

At the first clock cycle all registers in the array are reset and have a value of zero. Then the matrix A is fed by diagonals from below adding a zero padding (see FIG. 6). After n clock cycles all the registers in the MA-atoms are loaded with the elements of the matrix A so that $R_{ij}=a_{(i-1)(j-1)}$, $2\leq i,j\leq n$, and the last row of matrix A is located in the registers at the bottom of the atomic array. Due to the high parallel nature of the architecture, at this same clock cycle the entire first column of the matrix L is now available at the left part of the array:

$S_{high}=l_{11},$ $M_{i1}=l_{i1}, 2\leq i\leq n,$ where $S_{high}$ represents the higher output of the S-atom.

In the next clock cycle, $(n+1)$ zeros are fed to the array from below and the second column of L is available, again at the left side of the array so:

$S_{high}=l_{22},$ $M_{i1}=l_{(i+1)2}, 2\leq i\leq n-1.$

The process continues and in the $(n+k)$-th clock cycle the k-th column of the matrix L is computed and available at:

$S_{high}=l_{kk},$ $M_{i1}=l_{(i+k)2}, 2\leq i\leq n-k.$

Finally, after $(2n-1)$ clock cycles the process finishes having computed the whole matrix L.

Although the present invention has been described in accordance with the embodiment shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A computer hardware configuration for computing the Cholesky factorization of a positive definite matrix, comprising:
   a triangular array of MA atoms, each atom performing a registered multiply-add operation;
   a linear array of M atoms, each atom performing an unregistered multiply operation; and
   an S atom, performing an unregistered inverse-square-root operation.

* * * * *